(12) United States Patent
Li et al.

(10) Patent No.: US 9,811,497 B2
(45) Date of Patent: Nov. 7, 2017

(54) MEMORY EXTENSION SYSTEM AND METHOD

(71) Applicant: Huawei Technologies Co., Ltd., Shenzhen, Guangdong (CN)

(72) Inventors: Yansong Li, Shenzhen (CN); Yulin Zheng, Shenzhen (CN)

(73) Assignee: Huawei Technologies Co., Ltd., Suwon-si, Gyeonggi-do (KR)

( * ) Notice: Subject to any disclaimer, the term of this patent is extended or adjusted under 35 U.S.C. 154(b) by 252 days.

(21) Appl. No.: 14/584,698

(22) Filed: Dec. 29, 2014

(65) Prior Publication Data

US 2015/0113198 A1    Apr. 23, 2015

Related U.S. Application Data

(63) Continuation of application No. PCT/CN2014/076582, filed on Apr. 30, 2014.

(30) Foreign Application Priority Data

Sep. 25, 2013  (CN) .......................... 2013 1 0442041

(51) Int. Cl.
*G06F 12/06* (2006.01)
*G06F 13/42* (2006.01)
*G06F 13/40* (2006.01)

(52) U.S. Cl.
CPC ...... *G06F 13/4234* (2013.01); *G06F 13/4027* (2013.01)

(58) Field of Classification Search
CPC .......................... G06F 13/4234; G06F 13/4027
See application file for complete search history.

(56) References Cited

U.S. PATENT DOCUMENTS 5,621,900 A * 4/1997 Lane ..................... G06F 13/368
                                                                    710/120
7,962,676 B2 * 6/2011 Stenfort .............. G06F 13/4027
                                                                    370/241
(Continued)

FOREIGN PATENT DOCUMENTS

CN        101266538 A      9/2008
CN        101872213 A     10/2010
(Continued)

*Primary Examiner* — Henry Tsai
*Assistant Examiner* — John Roche

(57) ABSTRACT

A memory extension system and method are provided. The system includes a processor, an extended memory, an extended chip, and multiple processor installation positions, where a memory installation position is provided in each processor installation position; the multiple processor installation positions are connected through a QuickPath Interconnect (QPI) interface, the processor is installed in at least one processor installation position, and at least one of the other processor installation positions is used as an extended installation position; the extended chip is installed in at least one extended installation position; and the extended memory is installed in a memory installation position. In this memory extension system, an extended chip is installed in another processor installation position, so that an existing processor can access an extended memory of the extended chip by using the extended chip. Thereby, a memory capacity of the existing processor increases while a processing capability does not increase.

7 Claims, 5 Drawing Sheets

(56) References Cited

U.S. PATENT DOCUMENTS

| | | | |
|---|---|---|---|
| 8,775,686 B2* | 7/2014 | Stark | G06F 9/467 |
| | | | 709/223 |
| 2007/0162678 A1* | 7/2007 | Yang | G06F 15/7864 |
| | | | 710/306 |
| 2010/0042750 A1* | 2/2010 | Tsai | G06F 11/3034 |
| | | | 710/3 |
| 2010/0077179 A1 | 3/2010 | Stillwell, Jr. et al. | |
| 2010/0274999 A1 | 10/2010 | Chen | |
| 2011/0161592 A1* | 6/2011 | Nachimuthu | G06F 15/7871 |
| | | | 711/125 |
| 2011/0264833 A1 | 10/2011 | Zhang et al. | |

FOREIGN PATENT DOCUMENTS

| | | |
|---|---|---|
| CN | 101872308 A | 10/2010 |
| CN | 102473169 A | 5/2012 |
| CN | 103488436 A | 1/2014 |
| JP | 2011022937 A | 2/2011 |
| WO | WO 2013/081579 A1 | 6/2013 |

* cited by examiner

MEMORY EXTENSION SYSTEM AND METHOD

CROSS-REFERENCE TO RELATED APPLICATIONS

This application is a continuation of International Application No. PCT/CN2014/076582, filed on Apr. 30, 2014, which claims priority to Chinese Patent Application No. 201310442041.1, filed on Sep. 25, 2013, both of which are hereby incorporated by reference in their entireties.

TECHNICAL FIELD

The present application relates to the field of information storage technologies, and in particular, to a memory extension system and method.

BACKGROUND

A computing capability of a processor, a memory capacity, and a bandwidth of an input/output interface are three important indicators for evaluating performance of a computer system. To improve the computing capability, a high-performance processor, for example, a multi-core multi-thread processor, needs to be configured in a system. In addition, multiple processors are interconnected inmost cases to forma symmetric multiprocessor (SMP) or non-uniform memory access (NUMA) architecture to implement concurrent processing of a service. To expand the memory capacity, a processor generally integrates multiple memory controllers, and each controller can support multiple memory modules. In combination with the forgoing multi-processor technology, the memory capacity may be extended to a scale of several hundreds of GB. To increase the bandwidth of the input/output interface, the industry has launched high-speed interfaces, such as Peripheral Component Interconnect (PCI) Express, RapidIO, Interlaken, and 10G Ethernet interfaces, in the recent decade, and a rate constantly increases with upgrading of a protocol version.

Generally speaking, the computing capability, the memory capacity, and the bandwidth of the input/output interface should be configured in a balanced manner; otherwise, a performance bottleneck easily occurs, which affects overall performance of the computer system. However, in some special application scenarios, for example, servers used for different types of services (such as a Web server, a database server, and a streaming media server), have different emphasis on requirements for the three indicators. In a control function-oriented application scenario, the computing capability of the processor is of the utmost importance, and the memory capacity is relatively not so pressing. For a virtualization application scenario, because multiple services need to be deployed on multiple cores of the same processor and certain memory space needs to be allocated for each service, a more pressing requirement is imposed on the memory capacity.

A current server generally uses a universal multi-way processor design. Although the server may support multiple services, a service to be specifically performed is determined by a customer, for example, different application programs are installed to complete different service functions. Therefore, the server may have certain redundancy in a processing capability or a memory capacity, which increases a hardware cost and operating power consumption. For example, it is assumed that there is a four-way server in which a maximum of four processors can be installed, and each processor integrates a memory controller that can be externally connected to a memory module. In the foregoing virtualization scenario, it is possible that only two processors, instead of all four processors, need to be installed to meet a computing capability requirement. However, a memory capacity requirement may exceed a capacity of memories that come with the two processors. If the other two processors are also installed, the cost and power consumption increases; but if the other two processors are not installed, the memory capacity is insufficient.

SUMMARY

The present application provides a memory extension system and method to solve a problem of processing capability redundancy in the prior art caused due to that a processor is added to extend a memory capacity.

To solve the foregoing technical problem, according to a first aspect, the present application provides a memory extension system, and the system includes a processor, an extended memory, an extended chip, and multiple processor installation positions, where a memory installation position that is connected to the processor installation position is provided in each of the processor installation positions; the multiple processor installation positions are connected through a QuickPath Interconnect (QPI) interface, the processor is installed in at least one processor installation position, and at least one of the other processor installation positions is used as an extended installation position; the extended chip is installed in at least one extended installation position, where the extended chip has a unique identification number; and the extended memory is installed in a memory installation position that is connected to the extended chip, and all addresses of the extended memory are within an address space of the processor.

With reference to the first aspect, in a first possible implementation manner of the first aspect, a pin of the extended chip is compatible with a pin of the processor.

With reference to the first aspect or the first possible implementation manner of the first aspect, in a second possible implementation manner of the first aspect, the processor includes: a query instruction generating module, configured to generate an identification number query instruction; a query instruction sending module, configured to send the identification number query instruction through a QPI interface in the processor installation position in which the processor is located; an identification number receiving module, configured to receive an identification number through the QPI interface in the processor installation position in which the processor is located; an identification number determining module, configured to determine whether a received identification number is an identification number of the extended chip; and a configuring module, configured to, when the identification number is an identification number of the extended chip, configure a memory controller for the extended chip, and allocate, from the address space of the processor, a memory address corresponding to the extended memory that is connected to the extended chip.

With reference to the second possible implementation manner of the first aspect, in a third possible implementation manner of the first aspect, the processor further includes: a packet generating module, configured to generate a packet that is used for reading data or writing data and whose protocol is the QPI protocol; a packet sending module, configured to send the packet through the QPI interface in the processor installation position in which the processor is located; and a data receiving module, configured to receive, through the QPI interface in the processor installation position in which the processor is located, data that is read by the extended chip according to the packet.

With reference to the third possible implementation manner of the first aspect, in a fourth possible implementation manner of the first aspect, the extended chip includes: a query instruction receiving module, configured to receive the identification number query instruction through a QPI interface in the extended installation position in which the extended chip is located; an identification number acquiring module, configured to acquire the identification number of the extended chip according to the identification number query instruction; and an identification number sending module, configured to send the acquired identification number through the QPI interface in the extended installation position in which the extended chip is located.

With reference to the fourth possible implementation manner of the first aspect, in a fifth possible implementation manner of the first aspect, the extended chip further includes a QPI interface module, a protocol converting module, and a memory interface module, where the QPI interface module is connected to the QPI interface in the extended installation position in which the extended chip is located, and is configured to receive the packet that is sent by the processor and whose protocol is the QPI protocol; the protocol converting module is configured to convert the packet of the QPI protocol into a packet of a memory interface protocol and send the packet of the memory interface protocol to the memory interface module; the memory interface module is connected to the extended memory in the memory installation position in the extended installation position in which the extended chip is located, and is configured to read data from or write data into the extended memory according to the packet obtained after the protocol conversion, and send the read data to the protocol converting module; and the protocol converting module is further configured to convert the read data from the memory interface protocol into the QPI protocol and send the data to the QPI interface module, and the QPI interface module is further configured to send the data obtained after the protocol conversion through the QPI interface in the extended installation position in which the extended chip is located.

According to a second aspect, the present application provides a memory extension method, where the method includes: generating, by a processor, an identification number query instruction, and sending the identification number query instruction through a QuickPath Interconnect QPI interface in a processor installation position in which the processor is located; receiving, by an extended chip, the query instruction through a QPI interface in a processor installation position in which the extended chip is located, acquiring an identification number of the extended chip according to the identification number query instruction, and sending the acquired identification number through the QPI interface in the processor installation position in which the extended chip is located; and receiving, by the processor, the identification number through the QPI interface in the processor installation position in which the processor is located, determining whether the identification number is an identification number of the extended chip, and when the identification number is an identification number of the extended chip, configuring a memory controller for the extended chip, and allocating, from address space of the processor, a memory address corresponding to an extended memory that is connected to the extended chip.

With reference to the second aspect, in a first possible implementation manner of the second aspect, the method further includes: determining, by the processor, whether to send the identification number query instruction to all QPI interfaces in the processor installation position in which the processor is located; and if it is determined that the identification number query instruction is not sent to all QPI interfaces in the processor installation position in which the processor is located, sending, by the processor, the identification number query instruction to a QPI interface to which the identification number query instruction has not been sent.

With reference to the second aspect or the first possible implementation manner of the second aspect, in a second possible implementation manner of the second aspect, the method further includes: generating, by the processor, a packet that is used for reading data or writing data and whose protocol is the QPI protocol, and sending the packet through the QPI interface in the processor installation position in which the processor is located; receiving, by the extended chip, the packet through the QPI interface in the processor installation position in which the extended chip is located, after the packet is converted from the QPI protocol into a memory interface protocol, reading data from or writing data into the extended memory that is connected to the extended chip according to the packet obtained after the protocol conversion, and sending, after the read data is converted from the memory interface protocol into the QPI protocol, the read data through the QPI interface in the processor installation position in which the extended chip is located; and receiving, by the processor, the data obtained after the protocol conversion through the QPI interface in the processor installation position in which the processor is located.

It can be seen from the foregoing technical solution that, in the memory extension system provided by the present application, a processor is provided in some processor installation positions and an extended chip is provided in other processor installation positions. The processor and the extended chip perform a data interaction through a QPI interface between the processor installation positions. Each extended chip can separately connect to an extended memory of the extended chip. The processor can access the extended memory connected to each extended chip by using the extended chip.

Compared with the prior art, in a case in which a processing capability requirement is met but a memory capacity requirement exceeds a capacity of a memory that comes with a processor, this memory extension system uses an extended chip that is installed in another processor installation position to replace a processor, so that an existing processor can access an extended memory of the extended chip by using the extended chip. Thereby, a memory capacity of the existing processor increases while a processing capability does not increase, which avoids a problem of processing capability redundancy in the prior art caused due to that a processor is added to extend a memory capacity.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill

DETAILED DESCRIPTION

The following embodiments of the present application provide a memory extension system and method. The memory extension system is used for a multi-way processor. In a case in which a processing capability requirement is met but a memory capacity requirement exceeds a capacity of a memory that comes with a processor, an extended chip may be installed in another processor installation position to replace a processor, and a needed extended memory may be installed in a memory installation position of a processor installation position in which the extended chip is located. In this way, an existing processor may communicate with the extended chip through a QuickPath Interconnect (QPI) interface, to implement an access to the extended memory that is connected to the extended chip. Thereby, a problem of processing capability redundancy in the existing multiprocessor design caused due to that a processor is added to a server to extend a memory capacity can be resolved.

To enable a person skilled in the art to better understand technical solutions in the embodiments of the present application, and make the foregoing objectives, features, and advantages of the embodiments of the present application clearer and more comprehensible, the following describes the technical solutions of the embodiments of the present application in more detail with reference to accompanying drawings.

Figure 1:
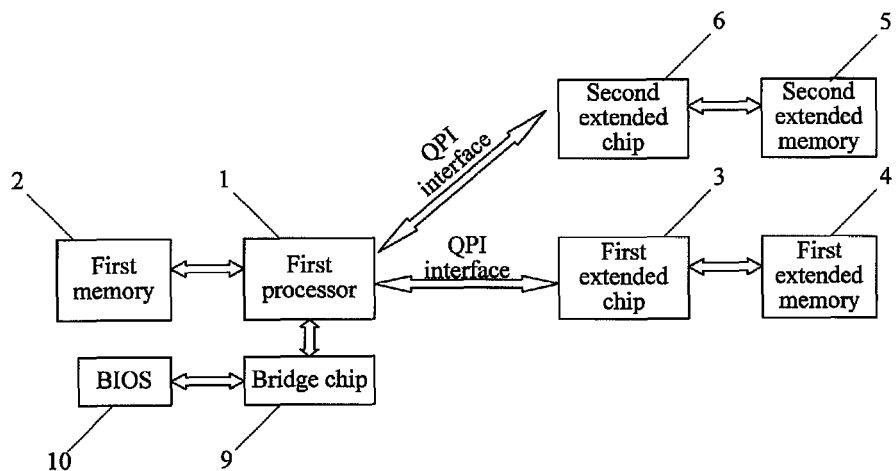
FIG. 1 is a schematic structural diagram of a memory extension system according to an embodiment of the present application.

An embodiment is as follows:

Referring to FIG. 1, FIG. 1 is a schematic structural diagram of a memory extension system according to this embodiment of the present application. In this diagram, a system of a multiprocessor design with three processor installation positions is used as an example. The memory extension system may include a first processor 1, a first memory 2, a first extended chip 3, a first extended memory 4, a second extended memory 5, and a second extended chip 6. The first processor 1, the first extended chip 3, and the second extended chip 6 are respectively installed in the three processor installation positions (not shown in the diagram). The three processor installation positions are connected through a QPI interface. The first memory 2 is a memory that comes with the first processor 1. The first extended memory 4 is connected to the first extended chip 3. The second extended memory 5 is connected to the second extended chip 6.

For convenience of description, in this embodiment of the present application, a processor installation position in which the first processor 1 is located may be referred to as a first processor installation position, a processor installation position in which the first extended chip 3 is located may be referred to as a first extended installation position, and a processor installation position in which the second extended chip 6 is located is referred to as a second extended installation position. The first processor 1 may be directly welded in the first processor installation position. In addition, for convenience of disassembly or convenience of assembly of the multiprocessor system, the first processor 1 may also be installed in the first processor installation position through a pluggable interface. The pluggable interface may be a pin and a socket that match each other, or a plug-in card and a slot that match each other. The first extended chip 3 and/or the second extended chip 6 may be fixed in a corresponding extended installation position in a manner of welding, and certainly, for ease of disassembly or assembly of the multiprocessor system, may also connect to a corresponding extended installation position in a manner of a pluggable interface. Data interaction is performed between the three processor installation positions through the QPI interface. The QPI interface is formed by 20 pairs of differential transmitted signals, 20 pairs of differential received signals, and 2 pairs of differential clock signals. A signal rate may reach 6.4 GT/s and a bidirectional bandwidth may be 25.6 GB/s. Moreover, the QPI interface also supports consistency of a cache, and may perform a configuration access to a peripheral device and read and write operations on a memory.

One or more memory installation positions are provided in each processor installation position to increase memory space. The first memory 2 is installed in the memory installation position in the first processor installation position, the first extended memory 4 is installed in the memory installation position in the first extended installation memory, and the second extended memory 5 is installed in the memory installation position in the second extended installation position. A processor installation position is connected to a memory installation position through a memory interface, and a protocol format for data interaction between the processor installation position and the memory installation position that is connected is a memory interface protocol format.

Each extended chip has a unique identification number. By using the identification number, it may be identified whether a component in a processor installation position is an extended chip. Each extended chip may connect to one or more extended memories, and addresses of all extended memories that connect to the extended chip are within an address space of the first processor 1. In addition, to ensure that each extended chip can be installed in a processor installation position, in this embodiment of the present application, a pin of each extended chip is compatible with a pin of the processor. In this embodiment of the present application, the following pin specifications of an extended chip may be compatible with a pin of the processor:

1. Power supply. Types of power supplies of a processor are diversified, for example, a core power supply, an I/O power supply, and the like, which are all provided by a power module on a board. A core voltage of an extended chip may be the same as that of the processor; a voltage required by the extended chip may also be converted from a voltage provided by the board by using an internal circuit of the extended chip. An I/O voltage of the extended chip is used to supply power to an I/O interface circuit. Because the extended chip also needs to provide a QPI interface, this part of circuit may directly use the voltage provided by the board. A position of the pin is consistent with that of the processor.

2. Ground. A ground may provide a loop for various power supplies and signals, and meanwhile provide a shielding function for a high-speed signal. An extended chip may directly use an existing ground signal of the processor.

3. Clock. A clock provides a reference clock for an internal module and an I/O interface of the processor. The processor has a phase-locked loop inside, and the phase-locked loop can multiply a frequency of an external clock provided by the board to obtain a higher frequency, and may also generate a memory interface clock to synchronize read and write accesses to a memory module. An extended chip may directly use an input reference clock of the processor, and multiply a frequency to obtain a working clock required by the extended chip. Meanwhile, the extended chip needs to receive and generate a QPI interface clock for communication with the processor at the peer end, and also needs to generate a memory interface clock to synchronize an access to a memory module. A position, a function, and an electrical characteristic of the pin are consistent with those of the processor.

4. Reset. A reset may set other components on the processor and the board to a determined initial state, and then the processor starts execution from the first instruction. An extended chip may directly uses a reset signal of the processor. A position, a function, and an electrical characteristic of the pin are consistent with those of the processor.

5. QPI interface. An extended chip also needs to provide a QPI interface. A position, a function, and an electrical characteristic of the pin are consistent with those of the processor.

6. Memory interface. An extended chip also needs to provide a memory interface, including an I2C interface for reading information about a memory module. A position, a function, and an electrical characteristic of the pin are consistent with those of the processor.

In FIG. 1, the reference numeral 9 represents a bridge chip and the reference numeral 10 represents a Basic Input/Output System (BIOS). The first processor 1 is connected to the bridge chip 9 (generally referred to as a southbridge) through a direct media interface (DMI). The first processor 1 may access the BIOS 10 by using the bridge chip 9. Generally, the first processor 1 that may access the bridge chip 9 is referred to as a master processor, and another processor is referred to as a slave processor (no slave processor is set in the embodiment shown in FIG. 1). After each power reset ends, the master processor always starts first, performs initialization for a peripheral device, and then controls a slave processor to start.

Figure 2:
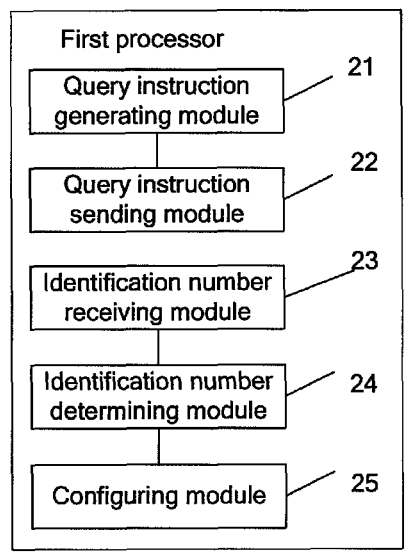
FIG. 2 is a schematic structural diagram of a first processor according to an embodiment of the present application.

Referring to FIG. 2, FIG. 2 is a schematic structural diagram of the first processor according to this embodiment of the present application. The first processor 1 may include:

a query instruction generating module 21, configured to generate an identification number query instruction;

a query instruction sending module 22, configured to send the identification number query instruction through a QPI interface in the first processor installation position;

an identification number receiving module 23, configured to receive an identification number through the QPI interface in the first processor installation position;

an identification number determining module 24, configured to determine whether the received identification number is an identification number of the extended chip; and a configuring module 25, configured to, when the identification number is an identification number of the extended chip, configure a memory controller for the extended chip, and allocate, from address space of the processor, a memory address corresponding to an extended memory that is connected to the extended chip.

Figure 3:
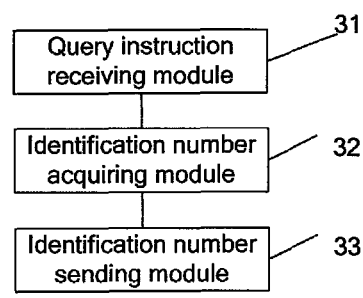
FIG. 3 is a schematic structural diagram of an extended chip according to an embodiment of the present application.

Corresponding to the first processor shown in FIG. 2, refer to FIG. 3, which is a schematic structural diagram of the extended chip according to this embodiment of the present application. The extended chip may include:

a query instruction receiving module 31, configured to receive the identification number query instruction through a QPI interface in the extended installation position in which the extended chip is located;

an identification number acquiring module 32, configured to acquire an identification number of the extended chip according to the identification number query instruction; and an identification number sending module 33, configured to send the acquired identification number through the QPI interface in the extended installation position in which the extended chip is located.

Thus, it can be seen that, after querying an identification number of the extended chip, the first processor 1 may then perform initialization for the extended chip.

In this embodiment of the present application, that the number of processors is 1 is used as an example. In an actual application, the number of processors may be set freely according to a requirement of a system for a computing capability, which may be two or more. When there are multiple processors, more QPI interfaces need to be provided by the processors.

Figure 4:
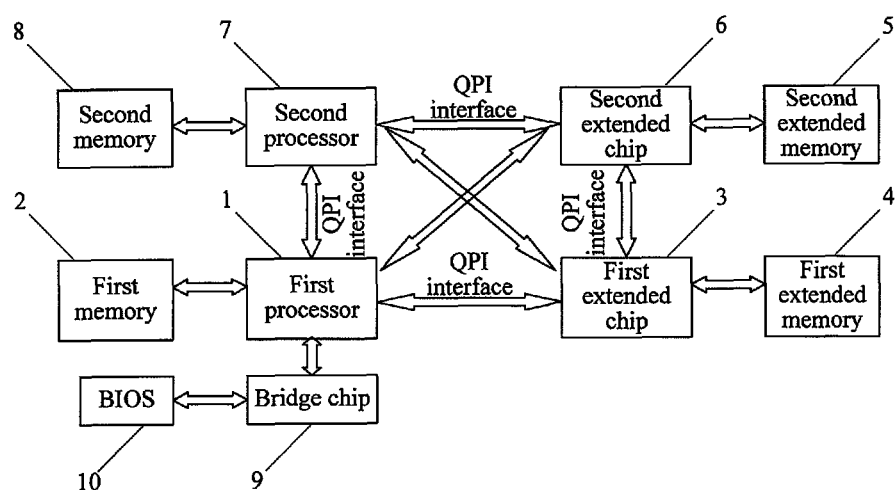
FIG. 4 is a schematic structural diagram of another memory extension system according to an embodiment of the present application.

Referring to FIG. 4, FIG. 4 is another schematic structural diagram of the memory extension system according to this embodiment of the present application. In the diagram, the memory extension system may further include a second processor 7 and a second memory 8. A processor installation position in which the second processor 7 is located is a second processor installation position, and the second memory 8 is a memory that comes with the second processor 7.

The first processor 1 directly is connected to the second processor 7 through a QPI interface. Both processors integrate a memory controller, and each processor may externally connect to one or more memories that belong to the processor. In addition, both processors support mutual accesses to the memories of each other. In the embodiment shown in FIG. 4, the first processor 1 may be referred to as a master processor, and the second processor 7 may be referred to as a slave processor. After power-on or a reset of the system ends, the master processor starts first, and executes code of a BIOS. After completing initialization of a peripheral device and preparing startup code for the slave processor, the master processor controls the slave processor to start, and then loads an operating system and starts to run the operating system on all processors.

After the system is powered on, the first processor 1 may access the extended memory of the extended chip after completing initialization of the peripheral device and successfully loading the operating system. In this embodiment of the present application, as shown in FIG. 5, the first processor 1 may further include:

a packet generating module 51, configured to generate a packet that is used for reading data or writing data and whose protocol is the QPI protocol;

a packet sending module 52, configured to send the packet through the QPI interface in the first processor installation position; and a data receiving module 53, configured to receive, through the QPI interface in the first processor installation position, data that is read and obtained by the extended chip according to the packet.

Figure 5:
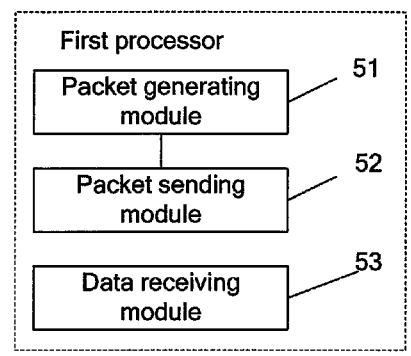
FIG. 5 is a schematic structural diagram of another first processor according to an embodiment of the present application.
Figure 6:
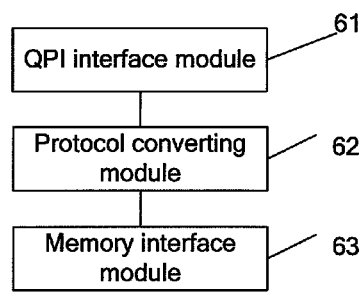
FIG. 6 is a schematic structural diagram of another extended chip according to an embodiment of the present application.

Corresponding to the first processor shown in FIG. 5, as shown in FIG. 6, the extended chip may further include a QPI interface module 61, a protocol converting module 62, and a memory interface module 63.

The QPI interface module 61 is connected to the QPI interface in the extended installation position in which the extended chip is located, and is configured to receive the packet that is sent by the first processor and whose protocol is the QPI protocol. Because data interaction between processor installation positions is performed through the QPI interface, the packet sent by the first processor is in a QPI protocol format.

The protocol converting module 62 is configured to convert the packet of the QPI protocol into a packet of a memory interface protocol and send the packet to the memory interface module 63. The extended chip and the extended memory connect to each other through a memory interface, that is, data interaction between the two is performed in a memory interface protocol format. Therefore, after receiving the packet in the QPI protocol format sent from the QPI interface, the protocol converting module 62 first parses the packet according to the QPI protocol to identify information included in the packet: a memory address to access, an access type (read or write), data length, and data to be written (for a write operation), and after converting the identified information into the memory interface protocol format, send the information to the memory interface module 63 so that the memory interface module 63 then sends the information to the extended memory. In addition, after the memory interface module 63 receives data sent by the extended memory, the protocol converting module 62 is further configured to convert the received data into the QPI protocol format, so that the QPI interface module 61 sends the data in the QPI protocol format to the first processor 1.

The memory interface module 63 is connected to the extended memory in the memory installation position in the extended installation position in which the extended chip is located, and is configured to read data from or write data into the extended memory according to the packet obtained after the protocol conversion, and send the read data to the protocol converting module 62.

It can be seen from the foregoing technical solution that, in the memory extension system provided by this embodiment of the present application, a processor is provided in some processor installation positions and an extended chip is provided in other processor installation positions. The processor and the extended chip perform a data interaction through a QPI interface between the processor installation positions. Each extended chip can separately connect to an extended memory, and the processor can access the extended memory connected to each extended chip.

Compared with the prior art, in a case in which a processing capability requirement is met but a memory capacity requirement exceeds a capacity of a memory that comes with a processor, this memory extension system uses an extended chip that is installed in another processor installation position to replace a processor, and accesses an extended memory of the extended chip by using the extended chip. Thereby, a problem of processing capability redundancy in the prior art caused due to that a processor is added to extend memory is avoided.

Moreover, compared with a processor, an extended chip is mainly used to perform protocol conversion, and has low costs and power consumption. Therefore, in the memory extension system provided by this embodiment of the present application, increase of a memory capacity may be implemented at low costs and power consumption.

In addition, in this embodiment of the present application, a first processor is used as an example for description, and a first extended chip and a second extended chip are affiliated to the first processor. In another embodiment of the present application, each extended chip may establish an association with different processors. For example, a second extended chip may be affiliated to a first processor, and may also be affiliated to a second processor. Likewise, a first extended chip is the same. When the second processor has an affiliated extended chip, for a structure of the second processor, refer to a structure of the first processor described in the foregoing embodiment, which is not described herein again. A correspondence between an extended chip and a processor may be freely set according to an actual use situation. For example, in this embodiment of the present application, the first extended chip and the second extended chip both belong to the first processor. Then, specific design is required for software and control of the first processor. For example, the first processor implements control over the second processor by controlling whether to allow the second processor to detect the extended chip.

Figure 7:
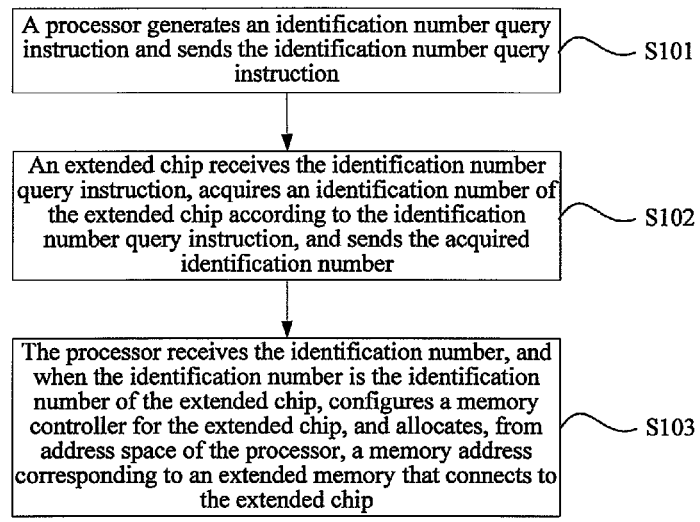
FIG. 7 is a schematic flowchart of a memory extension method according to an embodiment of the present application.

Another embodiment is as follows:

Corresponding to the memory extension system shown in FIG. 1, referring to FIG. 7, FIG. 7 is a schematic flowchart of a memory extension method according to this embodiment of the present application. The memory extension method may include the following:

S101: A processor generates an identification number query instruction and sends the identification number query instruction.

The processor sends the generated identification number query instruction through a QPI interface in a processor installation position in which the processor is located, and the identification number query instruction is used to determine an extended chip that is connected to the processor installation position in which the processor is located.

S102: An extended chip receives the identification number query instruction, acquires an identification number of the extended chip according to the identification number query instruction, and sends the acquired identification number.

A processor installation position in which each extended chip is located is connected to the processor installation position in which the processor is located through a QPI interface. Therefore, each extended chip may receive the identification number query instruction sent by the processor through the QPI interface in a processor installation position in which the extended chip is located. According to the identification number query instruction, the extended chip may query an identification number stored in the extended chip itself, and return the queried identification number to the processor through the QPI interface in the processor installation position in which the extended chip is located.

S103: The processor receives the identification number, determines whether the identification number is an identification number of the extended chip, and when the identification number is an identification number of the extended chip, configures a memory controller for the extended chip, and allocates, from address space of the processor, a memory address corresponding to an extended memory that is connected to the extended chip.

In this embodiment of the present application, a processor sends an identification number query instruction to all QPI interfaces on a processor installation position in which the processor is located, and receives a returned identification number. By identifying the identification number, the processor may confirm an extended chip that is connected to the processor installation position in which the processor is located. After the extended chip is identified, the processor may perform initialization operations on the extended chip and an extended memory that is connected to the extended chip, including configuring a memory controller for the extended chip and allocating address space to the extended memory, where, the operation of configuring a memory controller may enable the processor to perform operations such as data reading or writing on the extended memory that is connected to the extended chip; the operation of allocating address space to the extended memory may map the extended memory into a part of memory space of the processor. After the initialization operations are complete, the processor may access the extended memory that is connected to the extended chip. Certainly, the processor may also perform an initialization operation on a memory that comes with the processor. For example, in FIG. 1, the memory that comes with the first processor 1 is the first memory 2, and the first processor 1 may configure a memory controller for the first memory 2 and allocate address space for the first memory 2.

Figure 8:
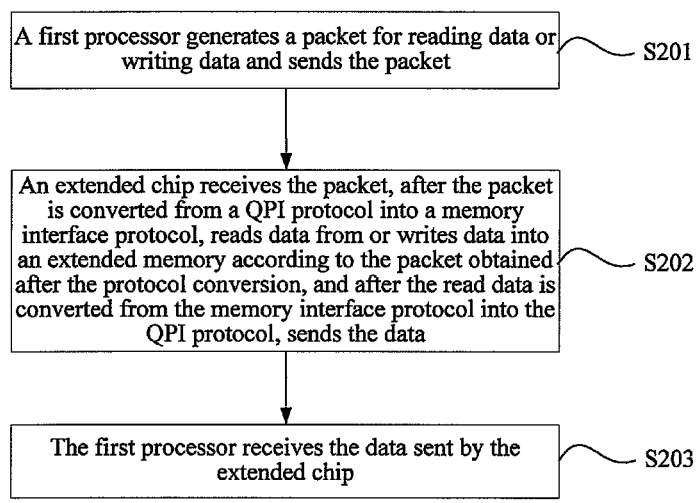
FIG. 8 is a schematic flowchart of another memory extension method according to an embodiment of the present application.

Referring to FIG. 8, FIG. 8 is another schematic flowchart of the memory extension method according to this embodiment of the present application. The memory extension method may further include the following:

S201: A first processor generates a packet for reading data or writing data and sends the packet.

The first processor generates, inside the first processor, the packet for reading data or writing data according to a data reading or writing requirement, and sends the packet through a QPI interface that is in a first processor installation position and is connected to the extended chip. Because data interaction between processor installation positions is performed through the QPI interface, the generated packet for reading data or writing data is in a QPI protocol format.

S202: The extended chip receives the packet, after the packet is converted from the QPI protocol into a memory interface protocol, reads data from or writes data into the extended memory according to the packet obtained after the protocol conversion, and after the read data is converted from the memory interface protocol data into the QPI protocol, sends the data.

The extended chip receives the packet sent by the first processor 1 through a QPI interface in an extended installation position in which the extended chip is located. The packet sent by the first processor is in the QPI protocol format, and the extended chip and the extended memory connect to each other through a memory interface, that is, data interaction between the two is performed in a memory interface protocol format. Therefore, after receiving the packet in the QPI protocol format, the extended chip first parses the packet according to the QPI protocol to identify information included in the packet: a memory address to access, an access type (read or write), data length, and data to be written (for a write operation), and after converting the identified information into the memory interface protocol format, send the information to the extended memory to read data from or write data into the extended memory. After data is read from the extended memory, the extended chip receives data sent by the extended memory, converts the data into the QPI protocol format, and sends the data to the first processor 1 through the QPI interface in the extended installation position in which the extended chip is located.

It may be seen from the foregoing description that, during a process of reading data or writing data, the extended chip is mainly used to perform protocol conversion. Compared with the prior art in which a new processor needs to be installed to increase a memory capacity, a manner of installing an extended chip to increase a memory capacity significantly reduces costs, and in addition, power consumption of the extended chip is very low compared with that of a processor.

S203: The first processor receives the data sent by the extended chip.

The first processor 1 receives the data in the QPI protocol format sent by the extended chip through the QPI interface in the first processor installation position.

It may be seen from the foregoing technical solution that, in the memory extension method provided by this embodiment of the present application, an identification number of an extended chip that is connected to a processor is searched, so that initialization operations are performed on the extended chip, including configuring a memory controller for the extended chip, allocating, from address space of the processor, a corresponding memory address to an extended memory, and loading a startup program into the extended memory. Therefore, when the processor needs to read or write data, the processor may directly access the extended memory that is connected to the extended chip by using the extended chip, that is, a problem that a processing capability is redundant may be resolved at relatively low costs and power consumption.

Figure 9:
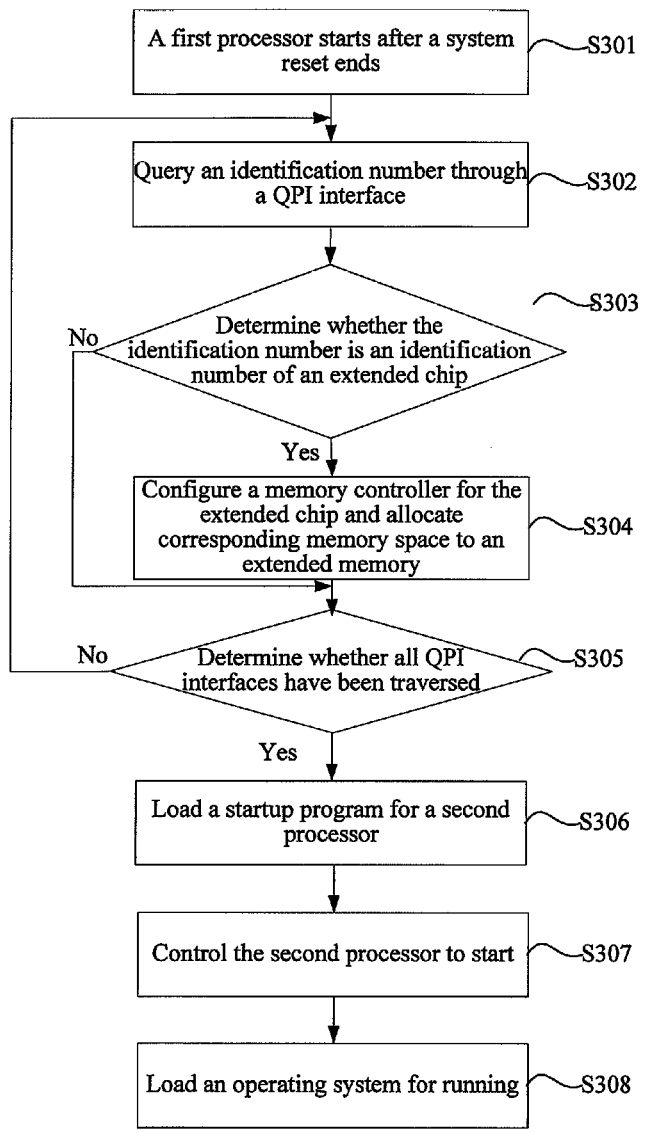
FIG. 9 is a schematic flowchart of still another memory extension method according to an embodiment of the present application.

In addition, for the multiprocessor memory extension system shown in FIG. 4, the first processor 1 serves as a master processor and the second processor 7 serves as a slave processor. During a specific implementation process, the processor 1 that serves as the master processor may further perform steps shown in FIG. 9:

S301: The first processor starts after a system reset ends.

S302: Query an identification number through a QPI interface.

S303: Determine whether the identification number is an identification number of the extended chip. If the identification number is an identification number of the extended chip, perform step S304; if the identification number is not an identification number of the extended chip, go to step S305.

S304: Configure a memory controller for the extended chip and allocate corresponding memory space to the extended memory.

S305: Determine whether all QPI interfaces in the first processor installation position have been traversed. If all QPI interfaces in the first processor installation position have been traversed, perform step S306; if not all QPI interfaces in the first processor installation position have been traversed, go to step S302.

S306: Load a startup program for the second processor.

S307: Control the second processor to start.

S308: Load an operating system for running.

By performing configuration in the foregoing steps, a peripheral device (that is, an extended chip) that is connected to the first processor may be initialized, and startup code may be prepared for the slave processor to control the other slave processor to start. Finally, the first processor loads the operating system and runs the operating system. After the extended chip is initialized, the first processor may access the extended memory that is connected to the extended chip.

Based on the descriptions of the foregoing method embodiment, a person skilled in the art may clearly understand that the present application may be implemented by using software in addition to a necessary universal hardware platform, or certainly, may also be implemented by using hardware. However, in most cases, the former is a preferred implementation manner. Based on such an understanding, the technical solutions of the present application essentially, or the part contributing to the prior art may be implemented in a form of a software product. The software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program code, such as a read-only memory (ROM), a random access memory (RAM), a magnetic disk, or an optical disc.

It may be understood that, the present application may be applied to various general or dedicated computing system environments or configurations, for example, a personal computer, a server computer, a handheld device or portable device, a tablet device, a multiprocessor system, a microprocessor-based system, a set-top box, a programmable consumer electronic device, a network PC, a mini computer, a mainframe computer, and a distributed computing environment that includes any of the foregoing systems or devices.

The present application may be described in a general context of a computer-executable instruction that is executed by a computer, for example, a program module. Generally, a program module includes a routine, a program, an object, a component, a data structure, and the like that can perform a specific task or implement a specific abstract data type. The present application may also be carried out in a distributed computing environment. In these distributed computing environments, a remote processing device that is connected over a communications network is used to perform a task. In a distributed computing environment, a program module may be stored in a storage medium of local and remote computers, including a storage device.

It should be noted that in the specification, relational terms such as first and second are used only to differentiate an entity or operation from another entity or operation, and do not require or imply that any actual relationship or sequence exists between these entities or operations. Moreover, the terms "include", "contain", or any variations thereof are intended to cover a non-exclusive inclusion. For example, a process, a method, an article, or a device that includes a series of elements, is not necessarily limited to these elements, but may include other elements that are not expressly listed, or may further include elements that are inherent to such process, method, article, or device. An element preceded by "includes a . . . " does not, without more constraints, preclude the existence of additional identical elements in the process, method, article, or device that includes the element.

The foregoing descriptions are merely exemplary implementation manners of the present application. It should be noted that a person of ordinary skill in the art may make certain improvements or polishing without departing from the principle of the present application, and the improvements or polishing shall fall within the protection scope of the present application.

What is claimed is:

1. A memory extension system, comprising:
a processor, an extended memory, an extended chip, and multiple processor installation positions, wherein:
each of the processor installation positions is connected to a corresponding memory installation position;
the multiple processor installation positions are connected through QuickPath Interconnect (QPI) interfaces, the processor is installed in at least one processor installation position, and at least one of the other processor installation positions is used as an extended installation position;
the extended chip is of a different type than the processor, the extended chip is installed in at least one extended installation position, and the extended chip has a unique identification number;
the extended memory is installed in a memory installation position that is connected to the extended chip, and all addresses of the extended memory are within an address space of the processor; and
the extended chip comprises:
a QPI interface module connected to a QPI interface in the extended installation position in which the extended chip is located, and configured to receive a packet that is sent by the processor using a QPI protocol;
a processing device configured to convert the packet from the QPI protocol into a memory interface protocol and send the packet to a memory interface module; and
the memory interface module connected to the extended memory in the memory installation position in the extended installation position in which the extended chip is located, and configured to read data from or write data into the extended memory according to the packet obtained after the protocol conversion, and send the read data to the processing device;
wherein the processing device is further configured to convert the read data from the memory interface protocol into the QPI protocol and send the data to the QPI interface module, and the QPI interface module is further configured to send the data obtained after the protocol conversion through the QPI interface in the extended installation position in which the extended chip is located.

2. The system according to claim 1, wherein one or more pins of the extended chip are compatible with one or more corresponding pins of the processor.

3. The system according to claim 1, wherein the processor is configured to:
generate an identification number query instruction;
send the identification number query instruction through a QPI interface in the processor installation position in which the processor is located;
receive an identification number through the QPI interface in the processor installation position in which the processor is located;
determine whether the identification number is an identification number of the extended chip; and
when the identification number is an identification number of the extended chip, configure a memory controller for the extended chip, and allocate, from the address space of the processor, a memory address corresponding to the extended memory that is connected to the extended chip.

4. The system according to claim 3, wherein the processor is further configured to:
generate the packet for reading data or writing data in accordance with the QPI protocol;
send the packet through the QPI interface in the processor installation position in which the processor is located; and
receive, through the QPI interface in the processor installation position in which the processor is located, the data that is read by the extended chip according to the packet.

5. The system according to claim 4, wherein the extended chip is configured to:
receive the identification number query instruction through a QPI interface in the extended installation position in which the extended chip is located;
acquire the identification number of the extended chip according to the identification number query instruction; and
send the acquired identification number through the QPI interface in the extended installation position in which the extended chip is located.

6. A memory extension method, comprising:
generating, by a processor, an identification number query instruction, and sending the identification number query instruction through a QuickPath Interconnect (QPI) interface in a processor installation position in which the processor is located;
receiving, by an extended chip, the identification number query instruction through a QPI interface in a processor installation position in which the extended chip is located, acquiring an identification number of the extended chip according to the identification number query instruction, and sending the acquired identification number through the QPI interface in the processor installation position in which the extended chip is located, wherein the extended chip is of a different type than the processor;
receiving, by the processor, the identification number through the QPI interface in the processor installation position in which the processor is located, determining whether the identification number is an identification number of the extended chip, and when the identification number is an identification number of the extended chip, configuring a memory controller for the extended chip, and allocating, from address space of the processor, a memory address corresponding to an extended memory that is connected to the extended chip;

generating, by the processor, a packet for reading data or writing data in accordance with a QPI protocol, and sending the packet through the QPI interface in the processor installation position in which the processor is located;

receiving, by the extended chip, the packet through the QPI interface in the processor installation position in which the extended chip is located, after the packet is converted from the QPI protocol into a memory interface protocol, reading data from or writing data into the extended memory that is connected to the extended chip according to the packet obtained after the protocol conversion, and sending, after the read data is converted from the memory interface protocol into the QPI protocol, the read data through the QPI interface in the processor installation position in which the extended chip is located; and receiving, by the processor, the data obtained after the protocol conversion through the QPI interface in the processor installation position in which the processor is located.

7. The method according to claim 6, further comprising:

determining, by the processor, whether the identification number query instruction has been sent to all QPI interfaces in the processor installation position in which the processor is located; and if it is determined that the identification number query instruction has not been sent to all QPI interfaces in the processor installation position in which the processor is located, sending, by the processor, the identification number query instruction to a QPI interface to which the identification number query instruction has not been sent.

* * * * *

UNITED STATES PATENT AND TRADEMARK OFFICE
CERTIFICATE OF CORRECTION

PATENT NO. : 9,811,497 B2  
APPLICATION NO. : 14/584698  
DATED : November 7, 2017  
INVENTOR(S) : Yansong Li et al.

Page 1 of 1

It is certified that error appears in the above-identified patent and that said Letters Patent is hereby corrected as shown below:

On the Title Page

(73) Assignee: delete "Suwon-si, Gyeonggi-do (KR)" and insert -- Shenzhen (CN) --.

Signed and Sealed this  
Twenty-ninth Day of May, 2018

Andrei Iancu  
*Director of the United States Patent and Trademark Office*